United States Patent [19]

Delany

[11] 4,281,638
[45] Aug. 4, 1981

[54] DAMPER FOR SOLAR HEATING SYSTEMS AND THE LIKE

[75] Inventor: John J. Delany, Madison, Wis.

[73] Assignee: Research Products Corporation, Madison, Wis.

[21] Appl. No.: 4,184

[22] Filed: Jan. 17, 1979

[51] Int. Cl.³ .............................. F24J 3/02; E06B 1/00
[52] U.S. Cl. ..................................... 126/428; 49/392; 126/285 B
[58] Field of Search .............. 126/432, 400, 450, 288, 126/285 R, 285 B, 429; 49/91, 92, 392; 98/110, 121 A, 121, 111, 113

[56] References Cited

U.S. PATENT DOCUMENTS

| 2,779,068 | 1/1957 | Blanchard | 49/92 |
|---|---|---|---|
| 3,191,241 | 6/1965 | Johnson | 98/110 |
| 3,357,136 | 12/1967 | Marantier | 49/392 |
| 3,631,790 | 1/1972 | Olsen | 98/110 |
| 4,038,781 | 8/1977 | Graham | 98/121 A |
| 4,129,116 | 12/1978 | Kent | 126/429 |

FOREIGN PATENT DOCUMENTS

| 2214464 | 9/1972 | Fed. Rep. of Germany | 49/392 |
|---|---|---|---|
| 2122319 | 11/1972 | Fed. Rep. of Germany | 126/285 |
| 2529776 | 1/1977 | Fed. Rep. of Germany | 49/392 |

*Primary Examiner*—James C. Yeung
*Attorney, Agent, or Firm*—Andrus, Sceales, Starke & Sawall

[57] ABSTRACT

A damper assembly for solar heating systems and the like includes a damper blade pivotably mounted to a peripheral main frame. The damper blade is surrounded by a peripheral flexible sealing element which extends inwardly from the surrounding frame and which is inclined in a direction against the direction of closing damper blade movement. As the damper moves toward a closed position, its sides progressively engage the side portions of the sealing element, with the latter providing a seal with the peripheral face of the blade. The ends of the blade engage the sealing element prior to the blade finally reaching its ultimate closed position, with the sealing being complete at the moment of engagement and throughout the final range of blade movement. The peripheral sealing element is mounted to a subframe which is adjustable on the main frame to thereby sealingly accommodate a warped damper blade. The damper blade is mounted for axial rotation on pins in such a manner that the previous tendency of the mount to bend the blade is substantially eliminated. The blade mounting pins are journalled for rotation in bearings having square exteriors and which are disposed very closely adjacent the squared-off ends of the subframe portions to reduce the possibility of leakage in the bearing area. The damper blade-bearing assembly is spring loaded axially to reduce tolerance problems.

17 Claims, 11 Drawing Figures

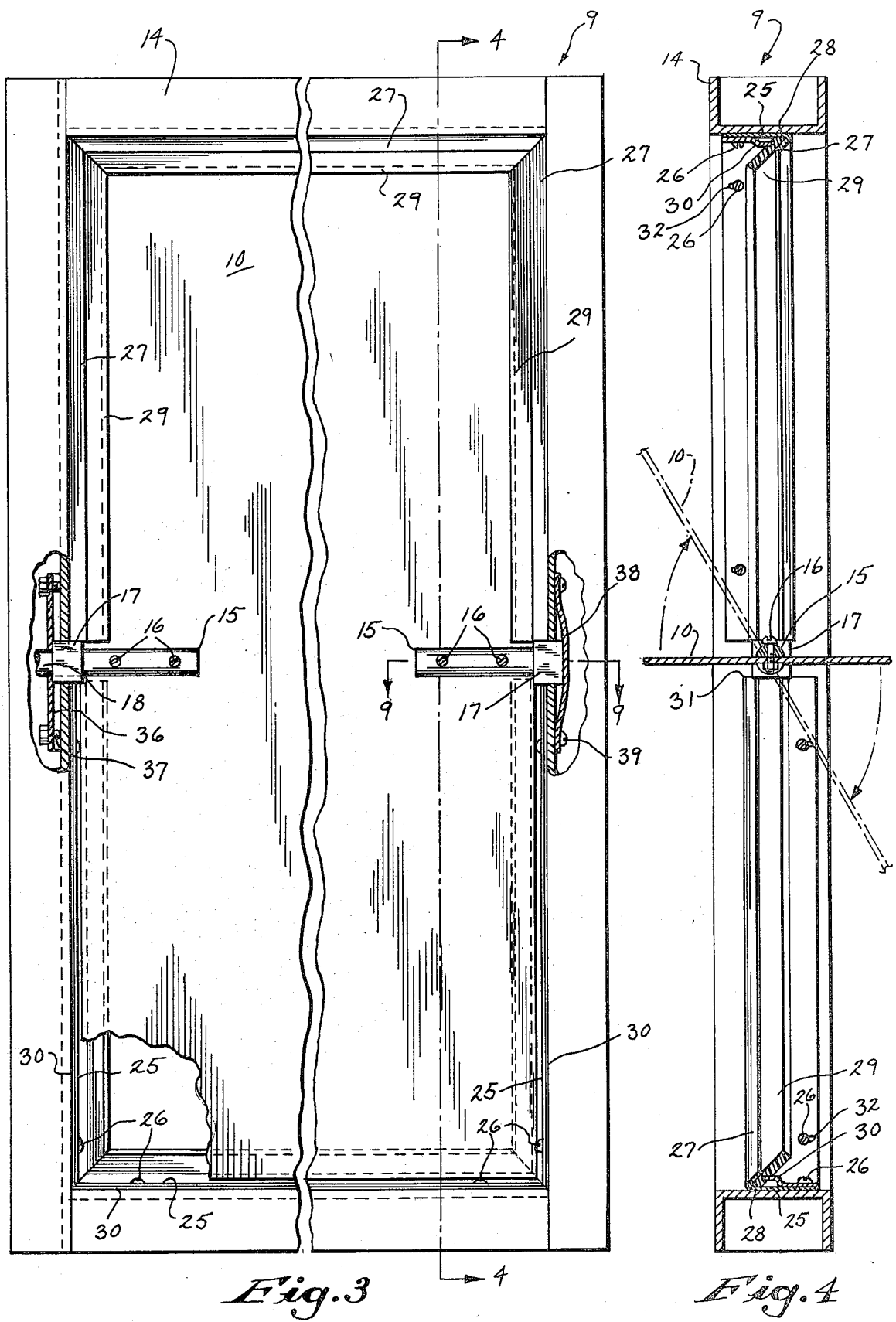

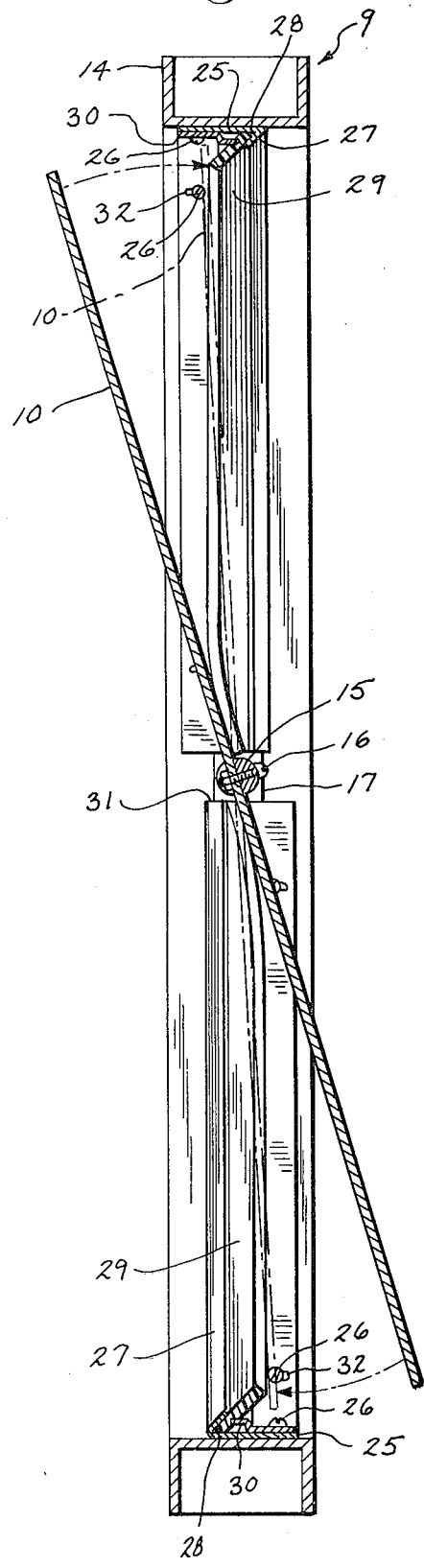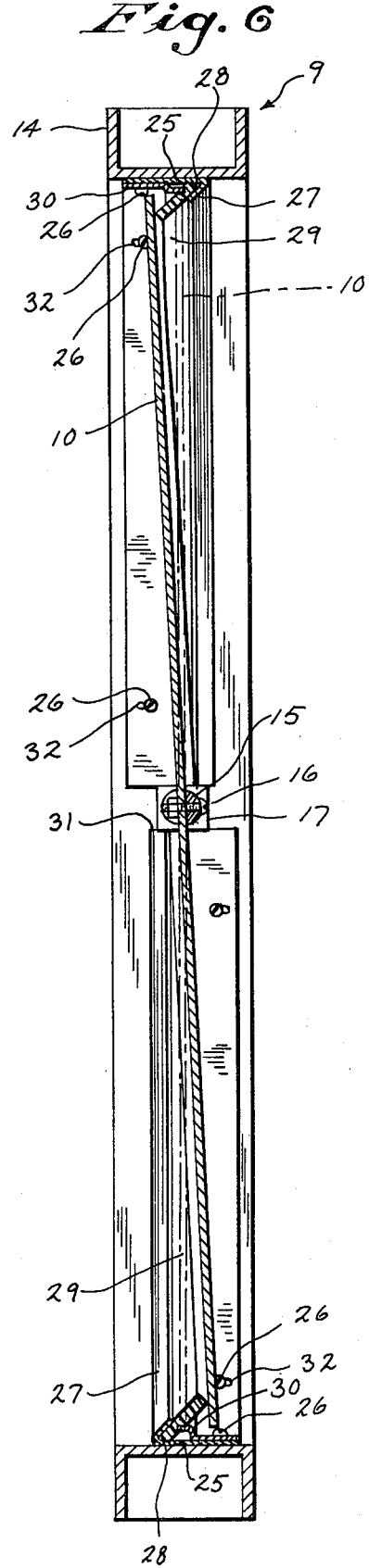

DAMPER FOR SOLAR HEATING SYSTEMS AND THE LIKE

BACKGROUND AND SUMMARY OF THE INVENTION

This invention relates to a damper for solar heating systems and the like.

In a solar heating system, a plurality of dampers are usually utilized to control the flow of heated air between a solar collector, a storage area and a utilization area such as a house. In view of present-day concern over conservation of energy, it is important that such systems are as tight and free of leakage as possible. It is especially desirable to prevent leakage back from the plenum toward the collector itself.

Prior motorized damper assemblies have usually utilized a seal member which sealed the edge of the damper to its peripheral frame. However, this has required that the motor bring the damper blade up to a fixed stop position before the seal was made. Warpage of the damper blade and improper adjustment of the motor control have caused undesirable leakage to occur at the seal area.

Warpage of the damper blade can be caused by many factors. Many damper systems utilize a single motor for operating a pair of damper blades, with a connector rod connecting the blades. This puts a strain on the blades, causing them to warp. An additional cause of warpage has been the damper blade mounting to an axial member which has been mounted to the blade in such a way that the blade tended to bend about the member. Other factors include torque forces and temperature changes.

The present invention is directed to an improved damper assembly which eliminates or reduces the effect of some of the aforementioned problems and which provides an improved sealing of the closed damper with accompanying reduced air leakage therethrough.

In accordance with one aspect of the invention, the damper blade is surrounded by a peripheral flexible sealing element which extends inwardly from the surrounding frame and which is inclined in a direction against the direction of closing damper blade movement. As the damper moves toward a closed position, its sides progressively engage the side portions of the sealing element, with the latter providing a seal with the peripheral face of the blade, as opposed to the edges thereof. The ends of the blade engage the sealing element prior to the blade finally reaching its ultimate closed position, with the sealing being complete at the moment of engagement and throughout the final range of blade movement. Thus, if the motor controls are improperly set or the damper blade is warped so that the blade does not reach its fully closed position, complete sealing will nevertheless take place.

In accordance with an additional aspect of the invention, the peripheral sealing element is mounted to a subframe which is adjustable on the main frame to thereby sealingly accommodate a warped damper blade.

In accordance with a further aspect of the invention, the damper blade is mounted for axial rotation on pins in such a manner that the previous tendency of the mount to bend the blade is substantially eliminated.

In accordance with yet another aspect of the invention, the blade mounting pins are journalled for rotation in bearings having square exteriors and which are disposed very closely adjacent the squared-off ends of the subframe portions to reduce the possibility of leakage in the bearing area.

Finally, the damper blade-bearing assembly is spring loaded axially to reduce tolerance problems.

BRIEF DESCRIPTION OF THE DRAWINGS

The accompanying drawings illustrate the best mode presently contemplated by the inventor for carrying out the invention.

In the drawings:

FIG. 3 is a front elevation of the damper assembly with the damper blade closed, and with parts broken away and in section;

FIG. 4 is a vertical section taken on line 4—4 of FIG. 3 and showing several open positions of the damper blade;

FIGS. 5 and 6 are views similar to FIG. 4 and showing progressive sealing of the side edges of the damper blade during initial closing movement;

DESCRIPTION OF THE PREFERRED EMBODIMENT

Figure 1:
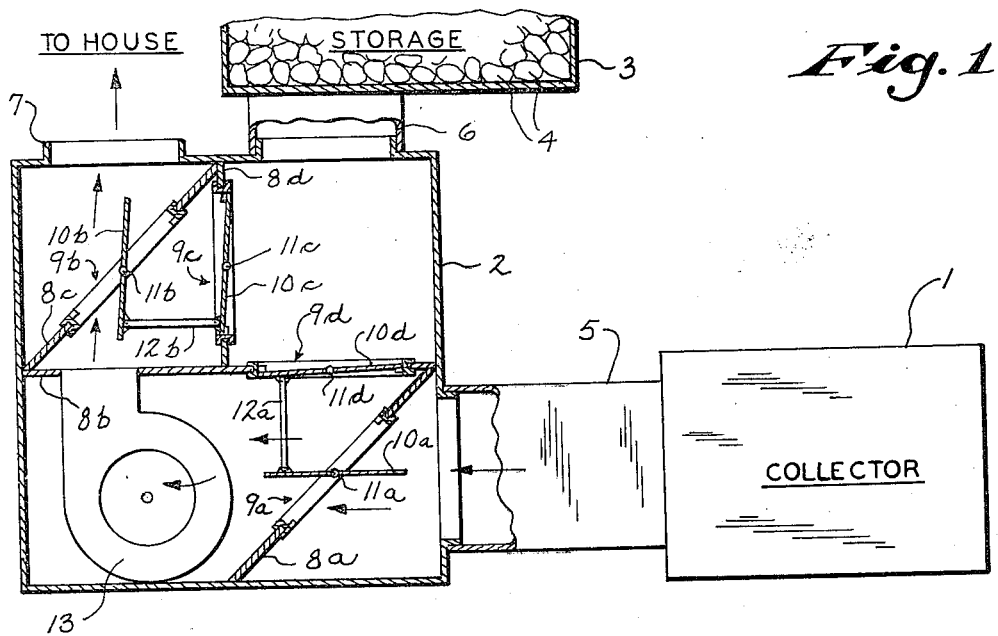
FIG. 1 is a schematic showing of a solar heating system which may utilize the improved damper arrangement of the present invention.

As shown in FIG. 1, the concepts of the invention may be utilized in a solar heating system which includes a solar connector 1 of any suitable known type, an air transfer housing 2 and a heat storage compartment 3 having rocks 4 or the like therein. Suitable ducts 5 and 6 connect housing 2 with collector 1 and storage compartment 3 respectively, and a discharge duct 7 connects housing 1 with a place of ultimate use of the heated air, such as a house, not shown.

Housing 2 contains a plurality of partitions 8a-8d, each of which has an opening therein and within which is mounted a respective damper assembly 9a-9d. The respective damper assemblies include damper blades 10a-10d which are mounted for motorized rotation about axes 11a-11d. Blades 10a and 10d are linked for simultaneous rotation by an arm 12a, while blades 10b and 10c are similarly linked by an arm 12b. Thus only two motors, not shown, may be used to drive all four damper blades.

A blower 13 is suitably disposed within housing 2 for causing the desired flow of air therethrough.

By suitably positioning the linked damper blades, heated air may be conducted from collector 1 directly to the point of use, as shown by the arrows in FIG. 1. Alternately, and with different damper blade positions, the air may be conducted from collector 1 to storage compartment 3, or from the latter to the point of ultimate use.

It is important that damper assemblies 9a–9d are constructed to reduce leakage of air therethrough to a minimum, whether blower 13 is turned on or off. This is especially true with assembly 9a wherein leakage or back-flow toward collector 1 could reduce the efficiency of the latter.

Figure 2:
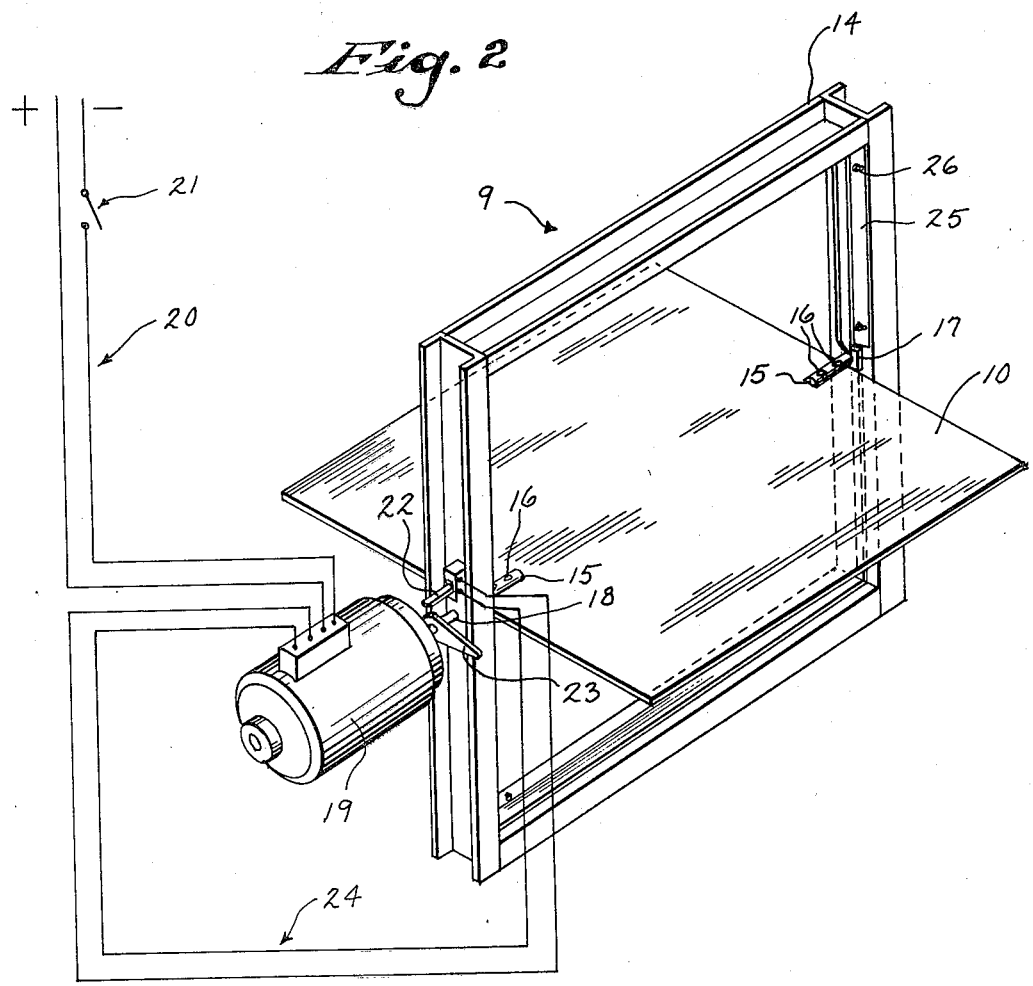
FIG. 2 is a perspective view of a damper assembly constructed in accordance with the invention and showing the motor control therefor, and with the damper blade open.

Turning now to the concepts of the present invention, and referring to FIGS. 2–4, the damper assembly 9 of the invention includes a rigid rectangular frame 14 of generally U-channel construction. Frame 14 is adapted to mount a plate-like damper blade 10 for rotation about a horizontal axis. For this purpose, a pair of opposed pins 15 are mounted to the midportions of the side edges of blade 10, as by bolts 16. Pins 15 are mounted in opposed bearings 17 which are disposed in the side walls of frame 14. One of the pins 15 is provided with an extension 18 which extends outwardly from frame 14 and forms the output shaft of a reversible damper drive motor 19 of any suitable known type. Suitable speed reduction mechanism, not shown, may be utilized between the motor itself and extension 18.

Motor 19 is connected to a suitable source of electrical energy through lines 20 having a control switch 21 therein. Closing of switch 21 will cause motor 19 to rotate damper blade 10 between an open horizontal position, as shown in FIG. 2, and a fully closed vertical position as shown in FIG. 8.

Means are provided to automatically de-energize motor 19 when damper blade 10 is essentially closed. This may preferably be accomplished by utilizing any well-known damper motor which automatically turns off after partial rotation of its shaft. However, in the embodiment schematically shown in FIG. 2, an adjustable microswitch 22 is mounted on the side wall of frame 14 and an arm 23 is mounted for rotation with pin extension 18. When the damper blade is essentially closed, arm 23 engages microswitch 22 which then stops motor 19, as through lines 24.

Because of large tolerances in the system due to wear, damper blade warpage and the like, prior devices for sealing the blade 10 to frame 14 have often been unsatisfactory, especially in solar applications. The present invention is adapted to substantially improve the sealing function.

Figure 8:
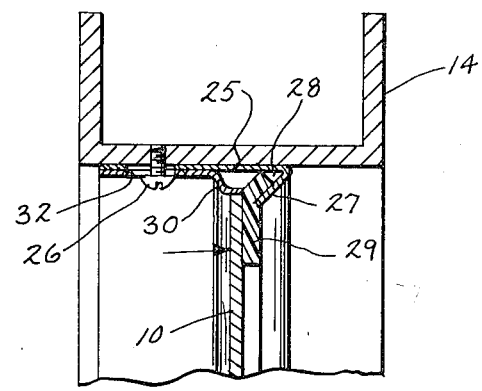
FIG. 8 is a view similar to FIG. 7 and showing a closed position of the blade.

For this purpose, and as best shown in FIGS. 3, 4 and 8, a sealing subframe is provided on main frame 14. The subframe comprises a peripheral thin metal strip 25 which is co-extensive with the inner wall of main frame 14 and which is secured to the latter by screws 26 which extend therebetween. An outer edge portion of strip 25 is bent up and back upon itself to form an inwardly inclined lip 27 which forms a longitudinal groove 28. Groove 28 receives and retains the edge portion of an elongated strip-like sealing element 29 which is held in position against lip 27 by a longitudinal holding clip 30, the latter being held in place on strip 25 by spot welds, not shown.

Sealing element 29 is of resilient flexible material such as silicone sponge tape which will remain flexible with age.

The construction is such that sealing element 29 assumes an inclined position so that its free edge is angled toward and faces its respective damper blade portion and against the direction of closing damper blade movement.

Because of the central pivotal mounting of damper blade 10, the blade portion on one side of the pivot axis closes in one direction, while the blade portion on the other side of the axis closes in the opposite direction. To accommodate this difference, the upper sealing element 29 above pins 15 extends to the left as shown in FIG. 4 while the lower sealing element beneath pins 15 extends to the right.

In actuality, the subframe and its associated parts and sealing element is formed of a multiplicity of separate sectional sides which meet and are mitred at the corners. The subframe section disposed along each of the end (top and bottom) edges of the main frame 14 is a separate full-length part. Along each side edge of main frame 14, the subframe is divided into two spaced sections having squared-off inner ends 31 disposed adjacent bearings 17.

Figure 7:
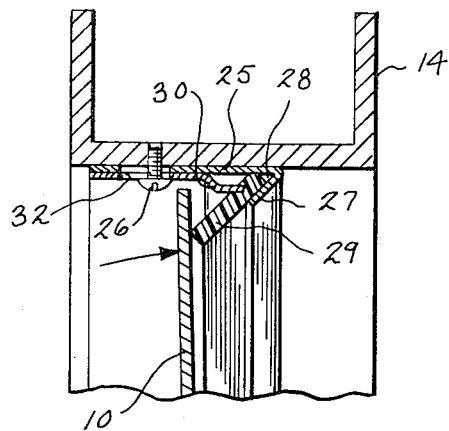
FIG. 7 is an enlarged fragmentary view showing initial engagement of the closing damper blade end with the sealing member.

Referring to the positions of damper blade 10 in FIGS. 4–6, as the damper closes, the peripheral side blade portions which extend laterally of the pivot axis progressively engage the sealing elements 29, gradually distorting them so that they move from an inclined position toward a position generally planular within the assembly. Elements 29 create a side seal with blade 10, as contrasted with an edge seal. Referring to FIGS. 7 and 8, as blade 10 moves toward its fully closed position, its end edge portions (top and bottom) which extend parallel to the pivot axis do not engage a sealing element 29 until the damper is almost closed. At the moment of engagement between the edge corner of element 29 and the face of blade 10, as in FIG. 7, a seal is created instantaneously and essentially along the full length of the end. At the time of this co-engagement, blade 10 is still spaced from its final closed position. As the blade moves from its slightly open position shown in FIG. 7 to its final position shown in FIG. 8, the seal continues in effect, with an increasing amount of the springable sealing element 29 engaging the full length of the side wall surface of the blade.

In the event motor 19 stops turning blade 10 at any point in the range between the positions of FIGS. 7 and 8, a complete top and bottom seal will still be created. Thus, variations of closing position caused by misalignment of the blade and the like, will not defeat the seal.

The construction is such that a side seal, rather than an edge seal, is provided along both the side and end peripheral face portions of blade 10.

In the event damper blade 10 is or becomes warped due to the aforementioned causes, the subframe including strips 25 and their associated parts is adjustable laterally on main frame 14. For this purpose, and referring to FIGS. 4 and 7, co-extensive transverse slots 32 are disposed in both strips 25 and clips 30, with screws 26 passing through the slots. Thus, during installation of the damper assembly or thereafter, if it is observed that blade 10 is out of alignment to a degree such that full sealing will not take place, screws 26 may be loosened to permit adjustment of the sealing elements relative to the misaligned blade. This adjustment will also be effective in the event main frame 14 is not exactly rectangular.

As best seen in FIGS. 2–4, bearings 17 are rectangular in external configuration and are disposed in very closely adjacent position relative to the squared-off ends 31 of the adjacent subframe sections. This line-to-line relationship transversely of the frame reduces leakage in the bearing area.

Figure 9:
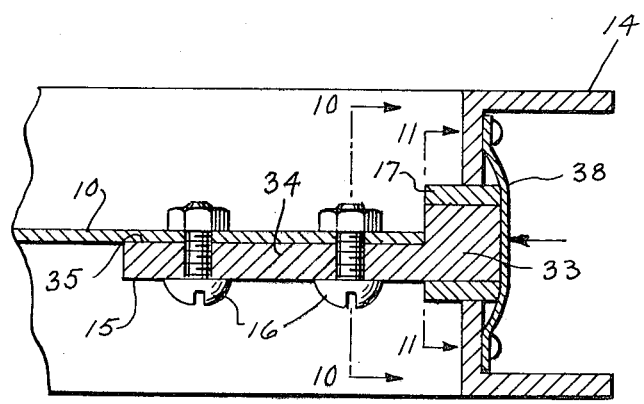
FIG. 9 is an axial section taken on line 9—9 of FIG. 3 and showing the damper mount.
Figure 10:
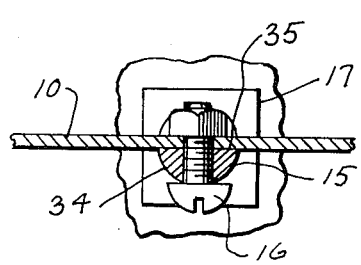
FIG. 10 is a transverse section taken on line 10—10 of FIG. 9.
Figure 11:
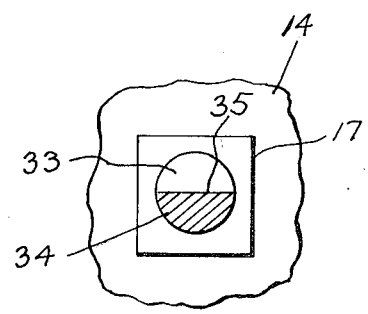
FIG. 11 is a further transverse section taken on line 11—11 of FIG. 9.

As previously indicated, prior damper blade mountings have tended to bend or warp the blade about its pivot axis. Referring to FIGS. 9-11, the blade mount disclosed herein substantially eliminates any bending moments about the pivot axis. As shown, each pin 15 comprises an enlarged head portion 33 disposed within bearings 17 and an inwardly extending shank 34 having a flat face 35 which is clamped to the face of damper blade 10 by bolts 16. The interface between shank 34 and blade 10 lies on the axis of rotation of the damper.

In numerous instances, tolerance problems with such units may create undesirable leakage adjacent the blade pivot mount. In the embodiment disclosed herein, the damper mounting is such that the damper blade-bearing assembly is spring loaded axially. For this purpose, and referring primarily to FIG. 3, one bearing 17 is held against outward axial shifting by a rigid backup plate 36 which is secured to frame 14 as by screws 37 and which is engaged by the outer bearing end. The outer end of the oppositely disposed bearing 17 is engaged by a flat spring 38 which is secured to frame 14 as by screws 39. Spring 38 serves as means to hold the entire blade-pin-bearing assembly together.

The damper assembly of the present invention has been found to be a major improvement over prior assemblies, in that air leakage therethrough is minimal. The assembly is easy to install and maintain, and adjustments to compensate for wear and warping can be readily made at any time.

Various modes of carrying out the invention are contemplated as being within the scope of the following claims particularly pointing out and distinctly claiming the subject matter which is regarded as the invention.

I claim:

1. In a solar heating system or the like, a damper assembly comprising, in combination:
   (a) a rectangular main frame,
   (b) a damper blade disposed within said frame,
   (c) means mounting said blade to said frame for blade rotation about a pivot axis between open and closed positions,
   (d) said blade having opposed side portions extending transverse to said pivot axis, and having opposed end portions extending parallel to said pivot axis,
   (e) a plurality of flexible sealing strips mounted on said frame and extending about the periphery of said blade,
   (f) said sealing strips being positioned for engagement with the peripheral blade face along the opposed side and end portions of said blade as the latter is rotatably closed,
   (g) said sealing strips being inclined toward their respective side and end blade portions and facing against the direction of closing damper blade movement,
   (h) a peripheral subframe disposed on the inner portion of said main frame,
   (i) means securing said sealing strips to said subframe,
   (j) and means mounting said subframe to said main frame for lateral adjustment of said subframe and sealing strips relative to said main frame.

2. The combination of claim 1 wherein the sealing strips disposed on one side of said pivot axis are inclined and face in a direction toward the respective side and end blade portions which is opposite to the direction of inclination of the strips disposed on the opposite side of said pivot axis.

3. The combination of claims 1 or 2 wherein a plurality of said sealing strips extend transverse to said pivot axis and form means to progressively sealingly engage with the peripheral blade face adjacent said opposed side portions of the blade as said blade is closed.

4. The combination of claim 3 wherein a plurality of sealing strips extend parallel to said pivot axis and form means to substantially instantaneously sealingly engage with the peripheral blade face adjacent said opposed end portions of the blade as said blade is moved toward closed position but at a point before the blade is in said closed position.

5. The combination of claim 4 wherein said second-named plurality of sealing strips form means to maintain sealing engagement with the peripheral blade face in the range of blade movement between said point and said closed position.

6. The combination of claims 1 or 2 wherein a plurality of sealing strips extend parallel to said pivot axis and form means to substantially instantaneously sealingly engage with the peripheral blade face adjacent said opposed end portions of the blade as said blade is moved toward closed position but at a point before the blade is in said closed position.

7. The combination of claim 6 wherein said second-named plurality of sealing strips form means to maintain sealing engagement with the peripheral blade face in the range of blade movement between said point and said closed position.

8. The combination of claim 1:
   (a) wherein said subframe includes a plurality of pairs of spaced sections extending transverse to said pivot axis and with the inner ends of each pair of said sections being squared-off,
   (b) and a damper blade bearing forming part of said first-named mounting means and disposed between and closely adjacent each pair of section inner ends,
   (c) said bearing being rectangular in external configuration to provide a generally line-to-line relationship with said inner ends to thereby reduce leakage therebetween, and being mounted to said blade.

9. The combination of claim 8 which includes:
   (a) a pin having an enlarged head disposed within said bearing and having an inwardly extending shank,
   (b) said shank having a flat face,
   (c) and means securing said damper blade to said shank so that said flat face engages the face of said blade along the said pivot axis.

10. The combination of claim 8 which includes means associated with said bearings to hold the damper blade-bearing assembly in fixed axial position.

11. The combination of claim 10 wherein said holding means comprises:
    (a) a rigid backup plate disposed adjacent and engaging one bearing,
    (b) and axial spring loading means disposed adjacent and engaging the other said bearing.

12. The combination of claim 1 wherein:
    (a) said peripheral subframe comprises: a thin strip member coextensive with the inner walls of said main frame, the outer edge portion of said strip member being bent back upon itself to form an inwardly inclined lip creating a longitudinal groove for receiving a said sealing strip,
    (b) said strip securing means comprises: longitudinal holding clips holding the sealing strip against said lip, (c) and said mounting means comprises: transverse slots disposed in said strip members and said clips, and mounting members passing through said slots into said main frame.

13. In a solar heating system or the like, a damper assembly comprising, in combination:
 (a) a rectangular main frame,
 (b) a damper blade disposed within said frame,
 (c) means mounting said blade to said frame for blade rotation about a pivot axis between open and closed positions,
 (d) said blade having opposed side portions extending transverse to said pivot axis, and having opposed end portions extending parallel to said pivot axis,
 (e) a plurality of flexible sealing strips mounted on said frame and extending about the periphery of said blade,
 (f) a peripheral subframe disposed on the inner portion of said main frame,
 (g) means securing said sealing strips to said subframe,
 (h) and means mounting said subframe to said main frame for lateral adjustment of said subframe and sealing strips relative to said main frame.

14. In a solar heating system or the like, a damper assembly comprising, in combination:
 (a) a rectangular main frame,
 (b) a damper blade disposed within said frame,
 (c) means mounting said blade to said frame for blade rotation about a pivot axis between open and closed positions,
 (d) said blade having opposed side portions extending transverse to said pivot axis, and having opposed end portions extending parallel to said pivot axis,
 (e) a plurality of flexible sealing strips mounted on said frame and extending about the periphery of said blade,
 (f) a subframe secured on the inner portion of said main frame,
 (g) said subframe including a plurality of pairs of spaced sections extending transverse to said pivot axis and with the inner ends of each pair of sections being squared-off,
 (h) and a damper blade bearing forming part of said mounting means and disposed between and closely adjacent each pair of section inner ends,
 (i) said bearing being rectangular in external configuration to provide a generally line-to-line relationship with said inner ends to thereby reduce leakage therebetween.

15. The combination of claim 14 which includes:
 (a) a pin having an enlarged head disposed within said bearing and having an inwardly extending shank,
 (b) said shank having a flat face,
 (c) and means securing said damper blade to said shank so that said flat face engages the face of said blade along the said pivot axis.

16. In a solar heating system or the like, a damper assembly comprising, in combination:
 (a) a rectangular main frame,
 (b) a damper blade disposed within said frame,
 (c) means mounting said blade to said frame for blade rotation about a pivot axis between open and closed positions,
 (d) said blade having opposed side portions extending transverse to said pivot axis, and having opposed end portions extending parallel to said pivot axis,
 (e) a plurality of flexible sealing strips mounted on said frame and extending about the periphery of said blade,
 (f) a subframe secured on the inner portion of said main frame,
 (g) said subframe including a plurality of pairs of spaced sections extending transverse to said pivot axis,
 (h) a damper blade bearing forming part of said mounting means and disposed between and closely adjacent each pair of section inner ends,
 (i) and means associated with said bearings to hold the said damper blade-bearing assembly in fixed axial position.

17. The combination of claim 16 wherein said axial shifting limiting means comprises:
 (a) a rigid backup plate disposed adjacent and engaging one bearing,
 (b) and axial spring loading means disposed adjacent and engaging the other said bearing to bias said blade toward said backup plate.

* * * * *

UNITED STATES PATENT AND TRADEMARK OFFICE
CERTIFICATE OF CORRECTION

PATENT NO. : 4,281,638
DATED : August 4, 1981
INVENTOR(S) : JOHN J. DELANY

It is certified that error appears in the above-identified patent and that said Letters Patent are hereby corrected as shown below:

Column 2, Line 44    After "solar" delete "connector" and substitute therefor ----collector----.

Signed and Sealed this

Sixth Day of October 1981

[SEAL]

Attest:

GERALD J. MOSSINGHOFF

Attesting Officer    Commissioner of Patents and Trademarks